April 21, 1942. W. L. GROENE 2,280,230
CRANKSHAFT BROACHING LATHE
Filed Sept. 17, 1940 2 Sheets-Sheet 1
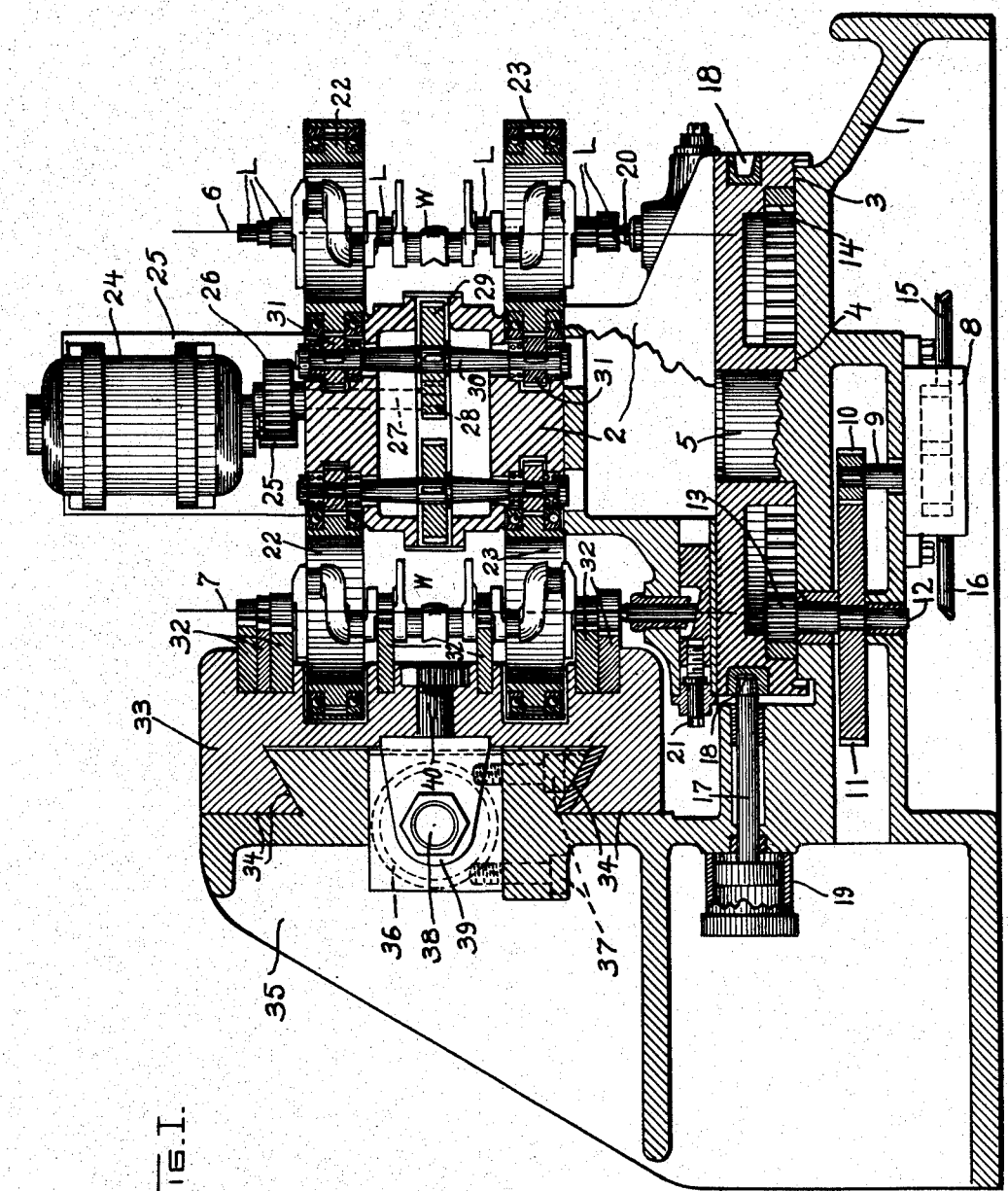
Fig. I.
INVENTOR.
Willard L. Groene

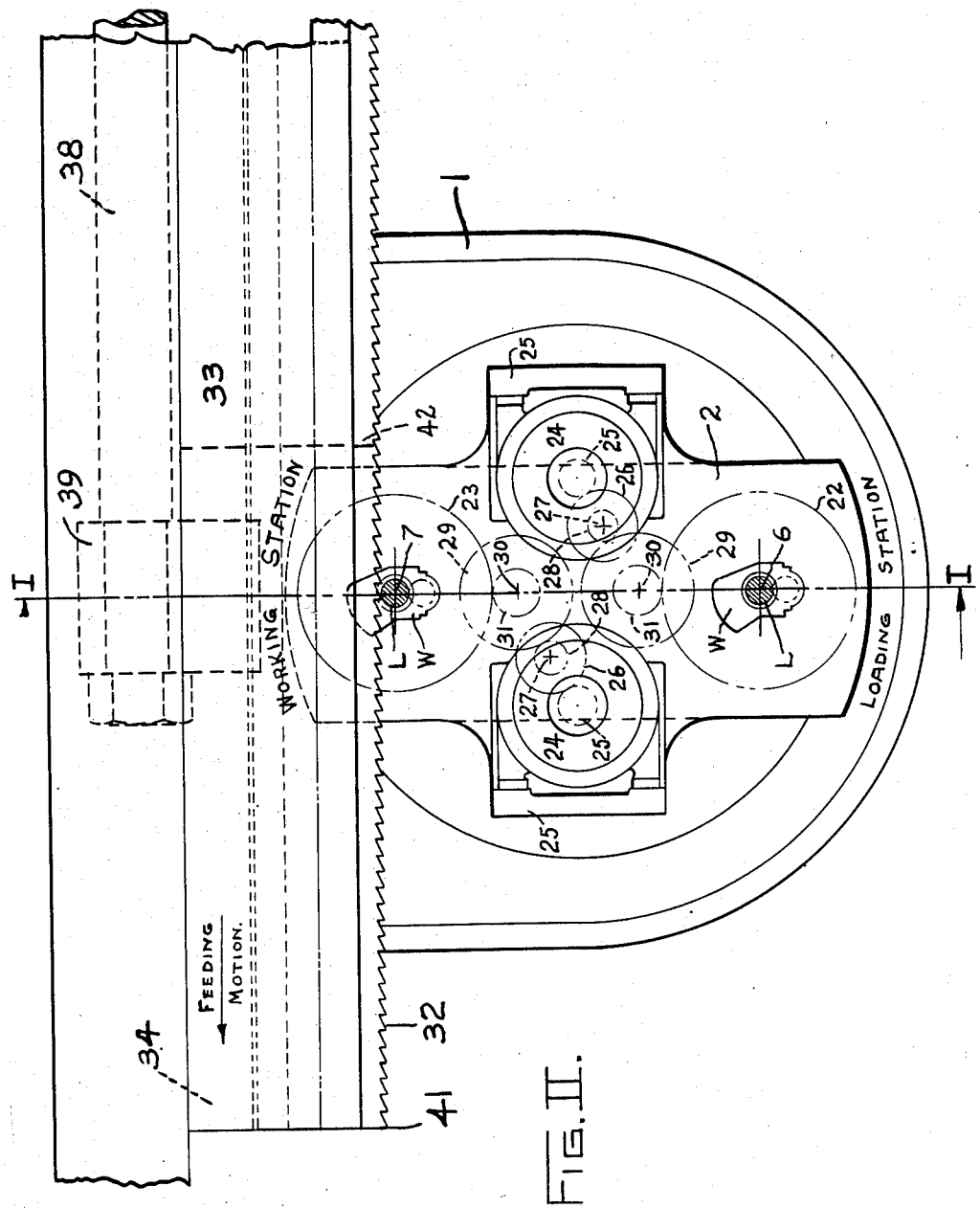

Patented Apr. 21, 1942

2,280,230

UNITED STATES PATENT OFFICE 2,280,230

CRANKSHAFT BROACHING LATHE

Willard L. Groene, Cincinnati, Ohio, assignor to The R. K. Le Blond Machine Tool Company, Cincinnati, Ohio, a corporation of Delaware Application September 17, 1940, Serial No. 357,149

8 Claims. (Cl. 90—33)

This invention pertains to multiple spindle indexing broaching lathes, and is particularly related to multiple spindle crankshaft broaching machines adapted to simultaneously broach all of the line bearings of a crankshaft at one time, as each crankshaft is respectfully indexed to the broaching means which moves tangentially of the various work surfaces to be broached.

One of the objects of the present invention is to provide a machine having an indexing work carrier upon which is mounted a series of work spindles each comprising center drive chucking mechanism for supporting and rotating a crankshaft intermediate its ends in such a way as to expose all of its line bearings for access of a series of broaching means which are moved tangentially of the bearings to be machined when each of the work spindles, carrying a work crankshaft, is indexed to a work station and held in said work station while being rotated at cutting speeds by suitable spindle drive mechanism.

Another feature of this invention is to provide in a multiple spindle broaching lathe, double center drive work spindles for supporting and rotating crankshafts so as to expose all of their line bearings for simultaneous cutting action and to apply a series of tangentially moved relatively long broaching cutters which are passed over these line bearing portions of the crankshafts when their respective work spindles are indexed to working position relative to said broaching means, the crankshaft being rotated by the work spindle at cutting speeds during passage of the broaches over the work.

A still further object of this invention is to provide in a machine having the above arrangement, means whereby at least one of the work spindles is presented to a loading station where work may be removed from and unfinished work may be inserted in said spindle while other work spindles are being operated upon at a work station by the relatively long broaching means and that upon completion of the machining operation for one of the work spindles, the work spindle just loaded will be indexed into the working position bringing the other work spindles to position for loading and unloading of the work therein.

Further features and advantages of this invention will appear from the detailed description of the drawings in which:

Figure I is a vertical transverse section through an exemplary embodiment of my invention in a multiple spindle double center drive indexing broaching lathe for machining the line bearings of crankshafts, shown on the line I—I of Figure II.

Figure II is a plan view of the machine in Figure I particularly showing the arrangement of the work spindles and driving motors on the work spindle carrier and fragmentary view of the long broaching slide carrying the broaching cutters which operate on the line bearings of the crankshaft to be machined.

The machine comprises a base 1, upon which is rotatably mounted the indexing work spindle carrier 2 upon which is mounted a series of work spindles, two in this particular exemplary disclosure. This carrier is mounted on suitable bearing surfaces 3 and 4 and guided centrally of the base 1 by means of the integral trunnion 5 thereof. This work spindle carrier is adapted to be rotated to the various indexed positions of each of the work spindles, whose axes of rotation are designated 6 and 7 and will be referred to as indicating each work spindle generally by a suitable hydraulic indexing motor 8 fixed to the base 1 of the machine and having a driving shaft 9 and pinion 10, which engages the gear 11 fixed on the shaft 12 suitably journaled in the base 1 of the machine. On the upper end of this shaft 12 is a driving pinion 13, which engages the internal ring gear 14 fixed in the bottom of the indexing work carrier 2, so that when fluid pressure is applied through the fluid pressure line 15 and 16, the hydraulic motor 8 is capable of rotating the carrier 2 about the trunnion 5 to bring one or the other of the work spindles 6 and 7 into the working position or the loading station of the machine.

An indexing plunger 17 slidably mounted in the base 1 is adapted to engage into a suitable indexing hole 18 formed in the indexing work carrier 2 and may be moved into or withdrawn therefrom by means of a suitable hydraulically actuated cylinder 19 attached to the plunger 17. The actuation of the hydraulic indexing motor 8 for moving the carrier 2 to approximate indexed position and the cooperating indexing plunger 17 actuated by the cylinder 19 may be operated in a sequence of actuation, as clearly and fully set forth in Patent #2,138,522, dated November 29, 1938, of William F. Groene and Walter R. Meyer, so as to effect the proper indexing of either work spindle 6 or 7 to the working position or loading station in the usual manner for such indexing mechanism.

Each of the work spindles 6 and 7 of the indexing work spindle carrier 2 comprises a center 20 vertically adjustable by means of a suitable actuating device 21 for engagement with the lower end of the crankshaft W to be machined. Also these work spindles each constitute a pair of center drive chucks 22 and 23, each having suitable chucking mechanism of a character, for example, as shown in reissue Patent No. 20,090 of William F. Groene, dated September 1, 1936, adapted to engage and support the crankshaft W in proper relationship and with the proper rigidity on the axis of rotation 6 and 7 of the work spindles.

Each of the center drive chucking devices 22 and 23 are driven by individual motors 24 carried on a suitable bracket 25 fixed to the top portion of the indexing work carrier 2. Each of these motors has a pinion 25 which drives a gear 26 on a shaft 27 appropriately journaled in the indexing carrier 2, which shaft in turn has a pinion 28 adapted to drive the gear 29 fixed on the synchronizing shaft 30, also journaled in the upper portion 2 of the indexing carrier. On this shaft 30 are fixed the pinions 31 of equal size which drive the equal size ring gears 22 and 23 of the center drive ring gear chucking devices, so that these center drive ring gears will be rotated in exact synchronism for proper driving and supporting of the crankshaft W. Each of these motors 24 are adapted to be controlled so that they may stop the work spindle when it is brought to the loading station as seen in Figure II, and may resume driving of the work spindle as it is indexed to the work station.

Associated with the work spindle at the work station is a series of relatively long straight broaching cutters 32 which are fixed on a large massive horizontally movable broaching slide 33 suitably slidably mounted on dove tail guide ways 34 so that the slide 33 may be moved with great rigidity along the rear elevated portion 35 formed integral with the base 1 of the machine. The actuation of this slide 33 may be affected by any suitable means, such for example, as the hydraulic fluid pressure cylinder 36, suitably fixed on the base 1 of the machine by the screws 37 and which has the usual piston (not shown) and piston rod 38 connected to the projecting lug 39 which in turn is securely fastened to the slide 33 by means indicated generally at 40. Thus fluid pressure applied in the cylinder 36 will affect feeding motion of the broach to the left as shown in Figure II and may be utilized for rapidly returning the broach at the completion of the broaching operation during the indexing of a new work spindle to the working station from the loading station, any suitable hydraulic control mechanism commonly utilized for this purpose being suitable to affect these motions in the broach slide 33.

The operation of this machine is substantially as follows:

Having placed an unfinished work piece in the work spindle 6 by suitably chucking and positioning it in the center drive chucking devices 22 and 23 and on the center 20, the work spindle carrier 2 is then indexed by suitable operation of the hydraulic indexing motor and indexing plunger 9 to bring this work spindle 6 to the working station shown in Figure II at which time the broaching means 33 and its broaching cutters 32 are removed fully to the right so that the ends 41 of the broaching cutters 32 are fully removed to the position indicated at point 42. Fluid pressure is then appropriately applied to the cylinder 36 to affect movement of the broach in feeding motion to the left, as shown in Figure II, while at the same time the respective motor 24 for rotating the work spindle 6 is energized to cause this work spindle to be rotated at cutting speeds. Meanwhile, as the spindle 7 was being indexed into the loading station, its respective drive motor 24 was stopped so that now at this time at the beginning of the actuation of the broaches 32 the work spindle 7 now at the loading station will be stopped so that work may be readily removed from it and a new unfinished work piece be placed therein which is done during the time the broaches 32 travel their entire length to complete the broaching of the line bearing portions L of the crankshaft W at the work station. Having completed the broaching operation, the broaches rapidly return by suitable actuation of the hydraulic feed cylinder 36 while at the same time indexing again takes place by the medium of the hydraulic indexing motor 8 to again bring the work spindle 6 back into the loading station as shown in Figure II and moving the now reloaded work spindle 7 into the work station for the continuation of the cycle just described.

Thus we have in a broaching lathe, a center drive arrangement for broaching a series of work pieces or crankshafts which are successively indexed to a work station at which horizontal broaching means are applied to machine all of the line bearings of the crankshaft at one time, while at same time providing an accessible loading station where at least one work spindle is capable of being continuously unloaded and reloaded with unfinished work pieces for the continuous uninterrupted cycle of operation of the machine.

Having thus fully set forth and described my invention what I claim as new and desire to secure by United States Letters Patent is:

1. A multiple spindle broaching lathe comprising a horizontally rotatable carrier member, a series of vertically arranged work spindles on said carrier, a horizontally actuated series of broaching cutters located at a work station and adapted to be fed in plane substantially tangent to the direction of indexing movement of the work spindles on said work carrier at said work station, means for indexing said carrier member to selectively present said vertically arranged work spindles at said work station, and means on said carrier for rotating said work spindle at said work station.

2. In a multiple spindle broaching lathe, a horizontally rotatable carrier member, a series of vertically arranged work spindles on the carrier, broaching cutters located at a work station adapted to be fed in a horizontal plane and in a plane tangent to the circle of indexing travel of said work spindles on said carrier member, means for indexing said carrier to selectively present said work spindles at said work station, and means for rotating said work spindles at cutting speeds when at said work station.

3. A multiple spindle broaching lathe comprising a horizontally rotatable carrier member, a series of vertically arranged work spindles each comprising center drive chucking mechanism and centers mounted on said carrier member, a series of broaching tools located at a work station adapted to tangentially engage work pieces held in said chucking mechanism in said work spindles, means for rotating said carrier member in indexing movement to successively present each of said work spindles at said work station, and means on said carrier for rotating said chucking mechanism when at said work station.

4. A multiple spindle machine comprising a rotatable carrier member movable in a horizontal plane, a series of vertically arranged work spindles on said carrier member each comprising a plurality of center drive chucking devices and centers mounted on said member, a series of horizontally feedable broaching cutters located at a work station and adapted to tangentially engage work held in said chucking devices, means for rotating said carrier member to successively bring said work spindles to said work station, means on said carrier member for individually rotating said chucking devices of each of said work spindles when at said work station, and means for loading and unloading work axially of said chucking devices when at a loading station.

5. In a multiple spindle broaching lathe, a horizontally rotatable member, carrying a plurality of vertically arranged rotary work holders, means providing a work station and a loading station, means for indexing said rotatable member to bring said work holders successively to said work station, and loading station, means for independently driving each of said work spindles when at said work station, a relatively large horizontally movable broaching slide at said work station, a series of broaching cutters fixed on said slide, and means for actuating said slide so as to move said broaches tangentially of a work piece in said work holders tangentially to the direction of its relative indexing movement of said work spindle when at said work station.

6. In a multiple spindle broaching lathe, a horizontally rotatable carrier member, a series of work spindles on said member each comprising vertically rotatable work spindles having a plurality of center drive chucking devices, mounted on the carrier member, a series of broaching tools adapted to be fed relative to the work in said work spindles in a horizontal direction, some of said broaching tools being located between said chucking devices, others located each side of said chucking devices, means for indexing said carrier member so as to successively bring each of said work spindles into cutting position relative to said broaching tools, and means for individually rotating said work spindles when presented to said broaching tools.

7. In a multiple spindle broaching lathe, a horizontally rotatable carrier member, a series of vertically mounted work spindles on said carrier member, each of said spindles comprising a single ring gear chucking device adapted to center and positively drive a work piece intermediate its ends and centers adapted to axially align and steady the ends of said work piece, a horizontally moving broaching tool adapted to engage said work pieces held in said spindles, means for indexing said carrier member to index said work spindles horizontally relative to said broaching tools, and means on said carrier member for rotating said chucking devices.

8. A multiple spindle broaching lathe comprising a horizontally rotatable carrier member, a series of vertically arranged work spindles on said carrier member each comprising a plurality of rotatable ring gear chucking devices, a relatively large horizontal broaching tool adapted to engage work pieces held in said chucking devices, some of said broaching tools being located between said chucking devices, other of said tools being located each side of said chucking devices, means on said carrier member for rotating said work spindles and chucking devices, and means for indexing said carrier member in horizontal motion to successively present each of said work spindles to said horizontally movable broaching tools.

WILLARD L. GROENE.